(No Model.)
M. J. COOK.
BREAD MAKING UTENSIL.
No. 255,255. Patented Mar. 21, 1882.
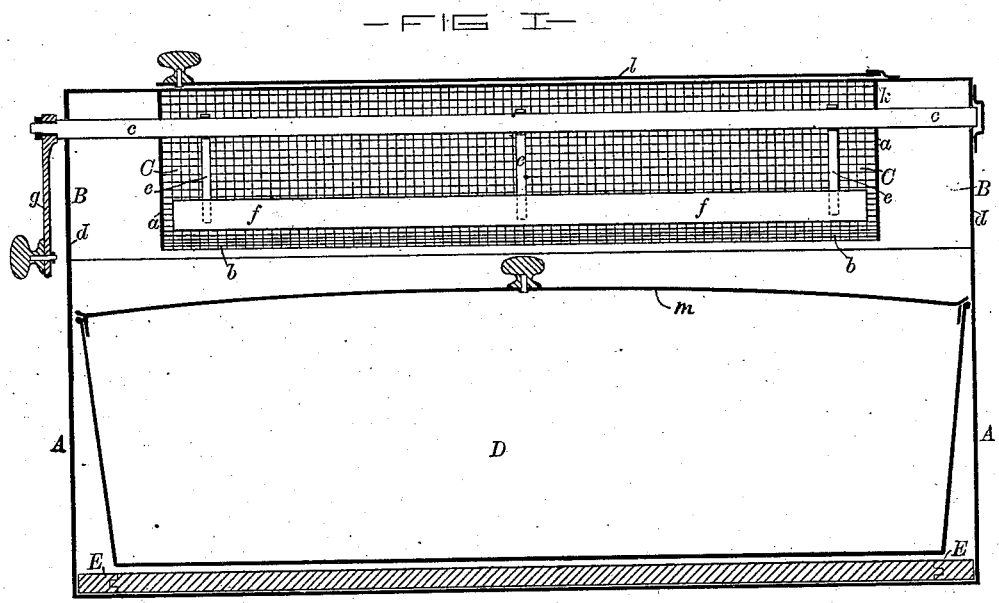
Fig I.
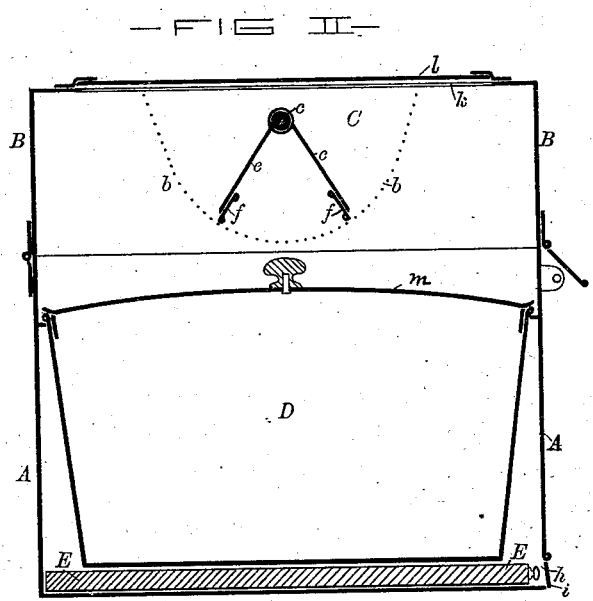
Fig II.
WITNESSES
W. T. Cole
A. S. Barbour
INVENTOR
Margaret J. Cook
by G. H. & H. T. Howard
Attys.
N. PETERS, Photo-Lithographer, Washington, D. C.

UNITED STATES PATENT OFFICE.

MARGARET J. COOK, OF BALTIMORE, MARYLAND.

BREAD-MAKING UTENSIL.

SPECIFICATION forming part of Letters Patent No. 255,255, dated March 21, 1882.

Application filed January 18, 1882. (No model.)

*To all whom it may concern:*

Be it known that I, MARGARET J. COOK, of the city of Baltimore and State of Maryland, have invented certain Improvements in a Bread-Making Utensil, of which the following is a specification.

This invention relates to a flour sieve, a bread-pan, and a bread-board, combined in a box, with the first-named article attached to the lid of the box, which has an opening therein, through which unsifted flour is introduced to the sieve, and a lid to prevent the escape of flour in the sifting operation.

It further consists in certain peculiarities of construction of the sieve, as will hereinafter appear.

In the further description of my said invention which follows reference is made to the accompanying drawings, forming a part hereof, and in which—

Figure I is a longitudinal section of the invention. Fig. II is a transverse section of the same.

Similar letters of reference indicate similar parts in both views.

A is the box, constructed preferably of tin-plate, having a hinged lid, B.

C is the sieve, which is formed as follows: Two semicircular plates, $a\ a$, are secured to the under side of the lid B, and their projecting edges connected by a piece of wire-cloth or a sheet of perforated metal, $b$. A shaft, $c$, extends entirely through the sieve, and is supported in the end plates, $d$, of the lid B. A dasher, which consists of strips $e$, attached to bars $f$, is suspended from the shaft $c$, and its lower edges are nearly in contact with the wire-cloth. The shaft $c$ and the dasher are oscillated by means of a handle, $g$, situated exteriorly of the box.

D is the bread-pan, suspended beneath the sieve; and E the bread-board which is placed under the pan D. The board E is introduced through an aperture, $h$, in the front of the box, provided with a hanging door, $i$. The top of the lid B has an opening, $k$, fitted with a sliding door, $l$, through which flour is introduced to the sieve. It is intended to keep the sieve supplied with flour, so that when bread is to be made a portion of the flour can be sifted to the pan beneath by merely oscillating the dasher by means of the handle. During the kneading of the dough the lid, with the sieve, is thrown back; but if at any time more flour is required the lid may be closed and the dasher again oscillated.

The board E can either be used in the box after the removal of the pan or after its withdrawal from the box.

The pan D has a cover, $m$, to prevent moisture from the dough being communicated to the flour in the sieve when the lid B is closed.

I claim as my invention—

In combination with the lid B, the end plates, $a\ a$, wire-cloth $b$, shaft $c$, pendent strips $e$, and handle $g$, substantially as specified.

MARGARET J. COOK.

Witnesses:
 JNO. T. MADDOX,
 WM. T. HOWARD.